United States Patent [19]
Takiguchi et al.

[11] Patent Number: 5,557,766
[45] Date of Patent: Sep. 17, 1996

[54] HIGH-SPEED PROCESSOR FOR HANDLING MULTIPLE INTERRUPTS UTILIZING AN EXCLUSIVE-USE BUS AND CURRENT AND PREVIOUS BANK POINTERS TO SPECIFY A RETURN BANK

[75] Inventors: Nobuhiro Takiguchi, Ohmiya; Soichi Kawasaki; Yasuo Yamada, both of Tokyo; Akira Kanuma, Yokohama, all of Japan

[73] Assignee: Kabushiki Kaisha Toshiba, Kawasaki, Japan

[21] Appl. No.: 964,142

[22] Filed: Oct. 21, 1992

[30] Foreign Application Priority Data

Oct. 21, 1991 [JP] Japan .................... 3-272750

[51] Int. Cl.⁶ .................... G06F 13/24; G06F 13/40; G06F 9/46
[52] U.S. Cl. .................... 395/405; 395/733; 395/740; 395/741; 395/308; 395/483; 364/230.2; 364/941; 364/DIG. 1; 364/DIG. 2; 364/240; 364/935.4
[58] Field of Search .................... 395/425, 725, 395/700, 650, 800, 775, 405, 427, 308, 306, 733, 734, 735, 736, 737, 738, 739, 740, 741, 742, 868, 483

[56] References Cited

U.S. PATENT DOCUMENTS

| | | | |
|---|---|---|---|
| 4,091,447 | 5/1978 | Dillon et al. | 395/737 |
| 4,217,638 | 8/1980 | Namimoto et al. | 395/421.1 |
| 4,250,546 | 2/1981 | Boney et al. | 395/735 |
| 4,459,657 | 7/1984 | Murao | 395/421.1 |
| 4,816,992 | 3/1989 | Matsumoto | 395/733 |
| 5,050,067 | 9/1991 | McLagan et al. | 395/700 |
| 5,146,581 | 9/1992 | Kaneko | 395/405 |
| 5,155,853 | 10/1992 | Mitsuhira et al. | 395/734 |
| 5,307,502 | 4/1994 | Watanabe et al. | 395/800 |
| 5,379,394 | 1/1995 | Goto | 395/308 |

FOREIGN PATENT DOCUMENTS

| | | |
|---|---|---|
| 0170284 | 2/1986 | European Pat. Off. . |
| 0202848 | 11/1986 | European Pat. Off. . |
| 2-183342 | 7/1990 | Japan . |

OTHER PUBLICATIONS

NEC User's Manual, μPD78602, Mar. 1990 (in Japanese), pp. 20, 21, 309, 380 and 383.
Wainwright, J. et al., "Register Banks Boost 16/32–Bit CPU Performance" Wescon Conference Record, vol. 31, pp. 1–8, 1987, Los Angeles, Calif., USA.

*Primary Examiner*—Glenn Gossage
*Attorney, Agent, or Firm*—Foley & Lardner

[57] ABSTRACT

A processor includes a bank-structured memory and is capable of handling multiple interrupts. The processor includes a central processing unit (CPU) comprising a plurality of data memories serving as general-purpose registers, and a plurality of bank specifying registers for use in specifying an address to save and restore data without involving an external system bus which connects the CPU and a program memory, such as a built-in read only memory (ROM), for storing a user program. The processor further includes a bank structured memory, connected to the CPU via an exclusive-use data bus, for holding data stored in the data memories using the bank specifying registers and for returning data stored in the bank structural memory to the data memories using the bank specifying registers. The bank specifying registers include a current bank pointer (CBP) or register for indicating a position of a bank presently in use, and a previous bank pointer (PBP) or register for indicating a bank position of data to be returned to the data memories after completing an interrupt routine. The processor may also include a program counter (PC) for indicating an address of a next instruction to be executed by the processor, a processor status word (PSW) for indicating a status of the processor, and a user stack pointer (USP) for indicating an address of a bank storing values of the program counter.

5 Claims, 11 Drawing Sheets

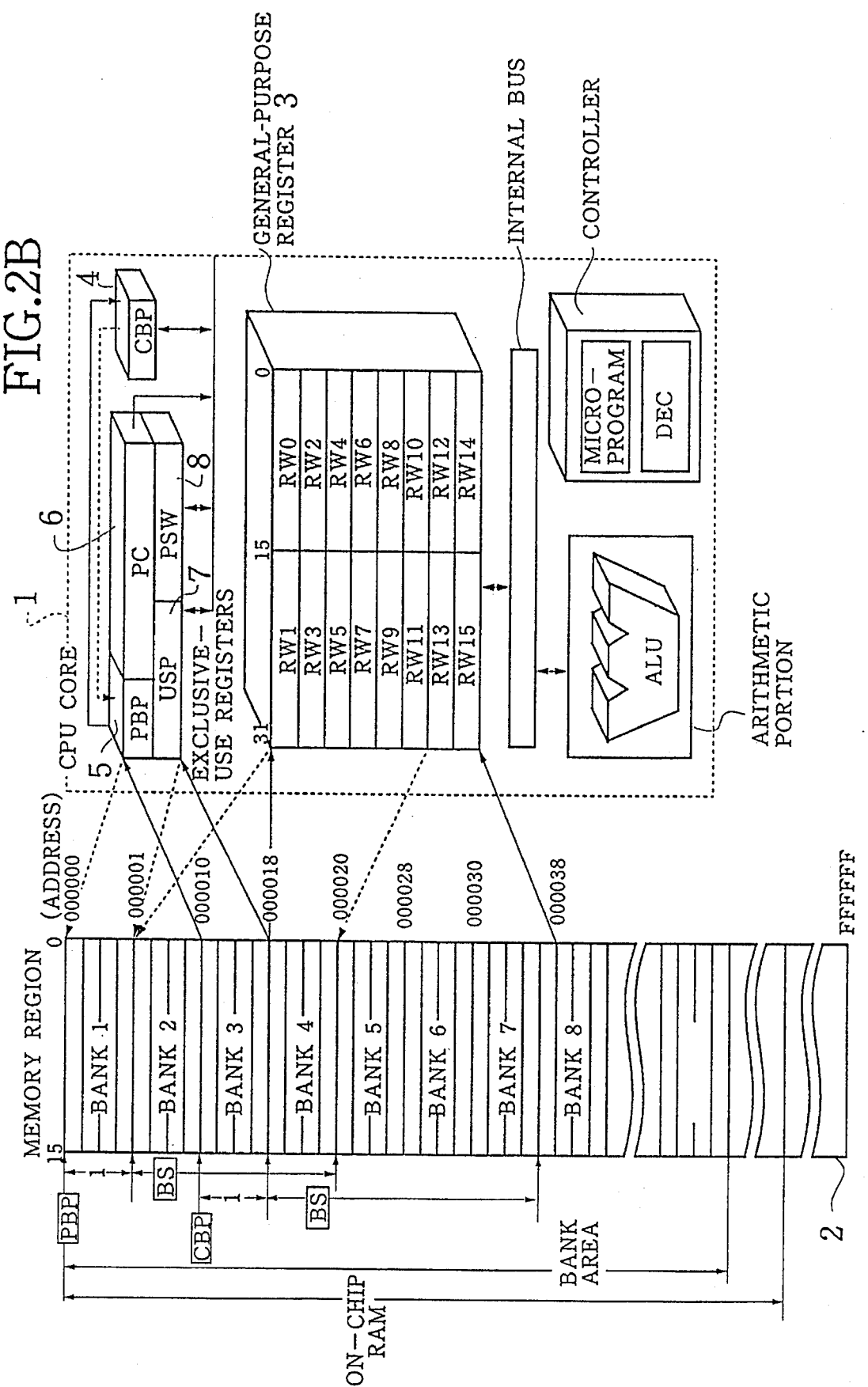

FIG.3
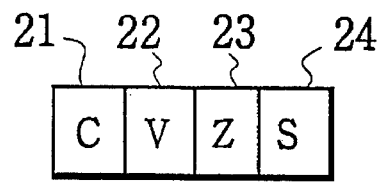
FIG.4
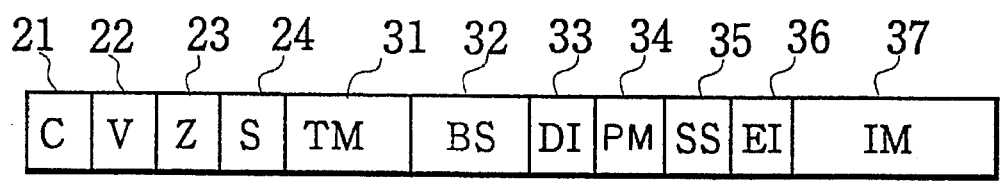
FIG.5
| PC | PBP | PSW | USP |
|----|-----|-----|-----|
| R0 | R1 | R2 | R3 |
| R4 | R5 | R6 | R7 |
| R8 | R9 | R10 | R11 |
| R12 | R13 | R14 | R15 |

FIG.6

BANK
NUMBER

| 1 | PBP, · · · |
| 2 | R<0~3> |
| 3 | R<4~7> |
| 4 | FOR INTERRUPT ROUTINE 1 |

| 4 | | PBP, · · · |
| 5 | | R<0~3> |
| 6 | | R<4~7> |
| 7 | | R<8~11> |
| | | FOR INTERRUPT ROUTINE 3 |

| 8 | PBP, · · · |
| 9 | R<0~3> |
| 10 | FOR INTERRUPT ROUTINE 2 |

| 10 | | | PBP, · · · |
| 11 | | | R<0~3> |
| 12 | | | R<4~7> |
| | | | FOR SUBROUTINE 2 |

| 12 | | PBP, · · · |
| 13 | | R<0~3> |
| 14 | | R<4~7> |
| 15 | | R<8~11> |
| 16 | | R<12~15> |
| | | FOR SUBROUTINE 1 |

| 15 | PBP, · · · |
| 16 | R<0~3> |
| 17 | R<4~7> |
| 18 | R<8~11> |
| 19 | R<12~15> |
| 20 | FOR MAIN ROUTINE |

BANK
NUMBER

| Bank | Main Routine | Subroutine 1 | Subroutine 2 | Interrupt 1 | Interrupt 2 | Interrupt 3 |
|---|---|---|---|---|---|---|

1 — RETURN BANK NUMBER
2 — PC,···
3 — R<0~3>
    FOR INTERRUPT ROUTINE 1

4 — RETURN BANK NUMBER
5 — PC,···
6 — R<0~3>
7 — R<4~7>
    FOR INTERRUPT ROUTINE 3

8 — RETURN BANK NUMBER
9 — PC,···
10 — R<0~3>
    FOR INTERRUPT ROUTINE 2

11
12 — RETURN BANK NUMBER ; RETURN BANK NUMBER
13 — PC,··· ; PC,···
14 — RETURN BANK NUMBER ; R<0~3> ; R<0~3>
15 — PC,··· ; R<4~7>
    FOR SUBROUTINE 2
16 — R<0~3> ; R<8~11>
17 — R<4~7>
    FOR SUBROUTINE 1
18 — R<8~11>
19 — R<12~15>
20 — FOR MAIN ROUTINE

FIG.10A
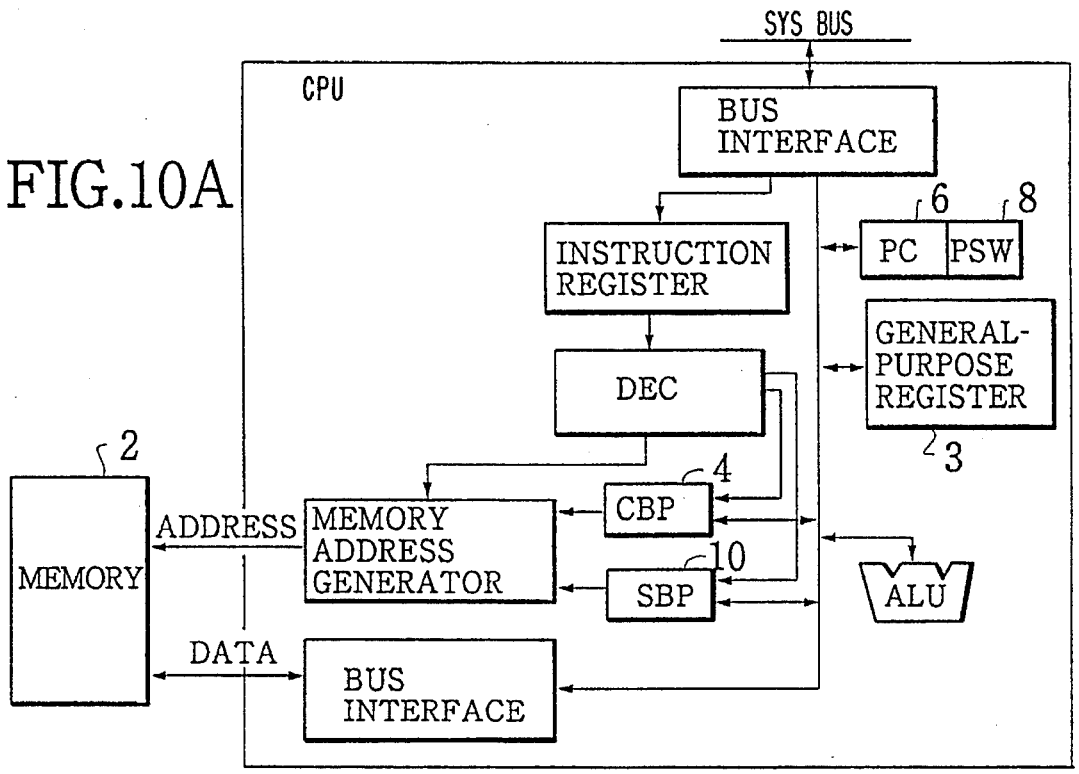
FIG.10B
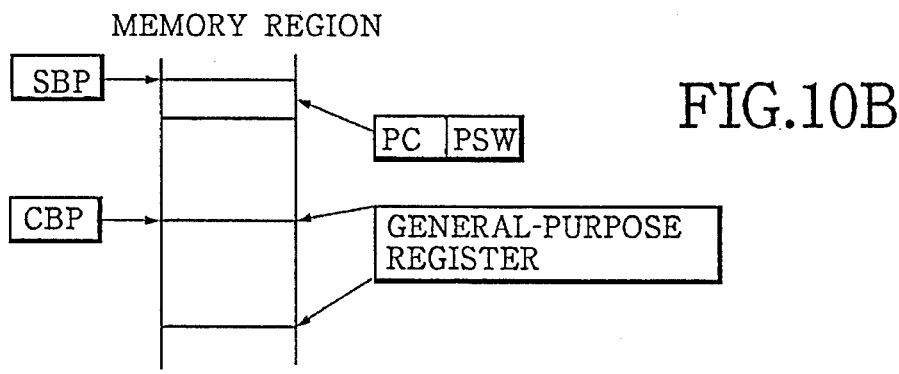
*STORE OF GENERAL-PURPOSE REGISTER, PC & PSW*
FIG.10C
INSTRUCTION : CCBP (#CBP), (#SBP)
              LD    CBP , (#CBP)
INTERRUPT : SPECIFY CBP, SBP
            AT MODE WORD
*UPDATE OF CBP & SBP*

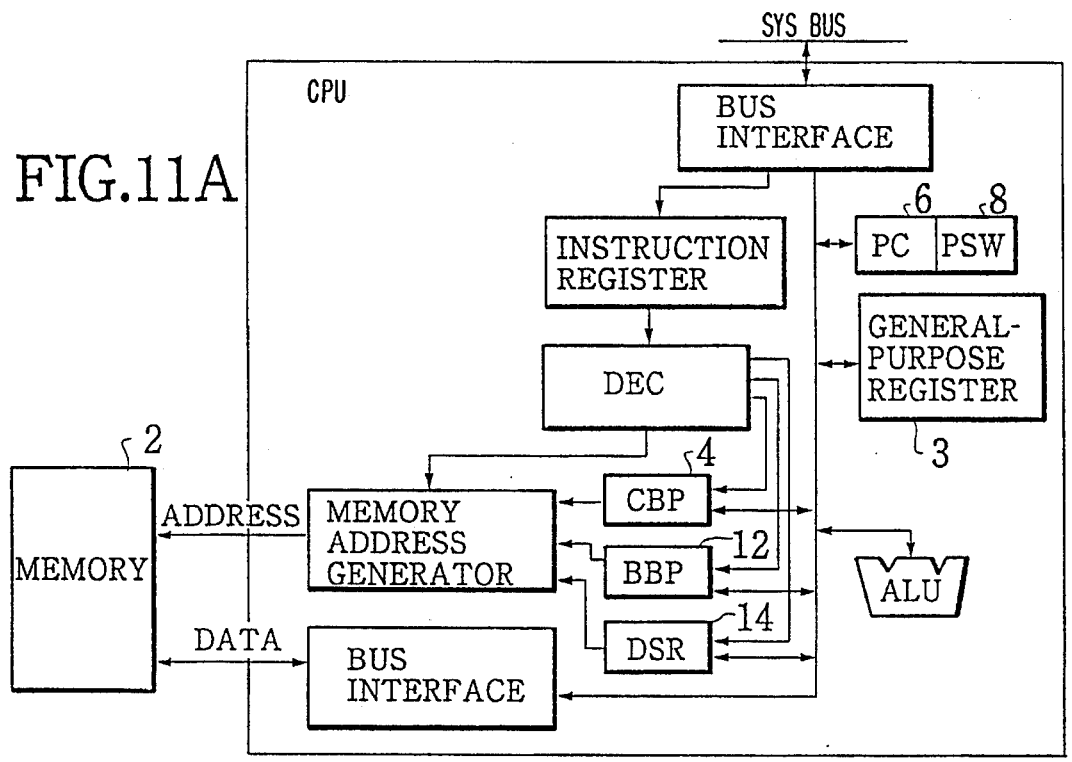
FIG.11A
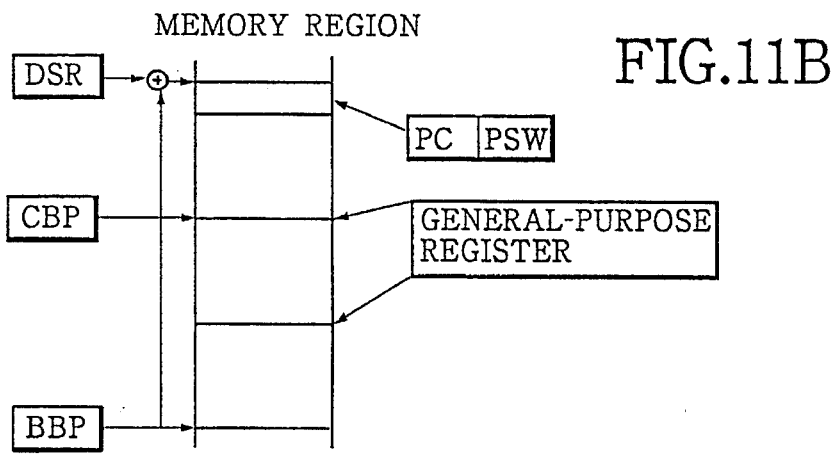
FIG.11B
STORE OF GENERAL-PURPOSE
REGISTER, PC & PSW
FIG.11C
INSTRUCTION : CBBP(#BBP),(#DSR)
            LD    CBP,(#CBP)
INTERRUPT : SPECIFY BBP(=CBP), DSR
           AT MODE WORD
UPDATE OF CBP, BBP & DSR

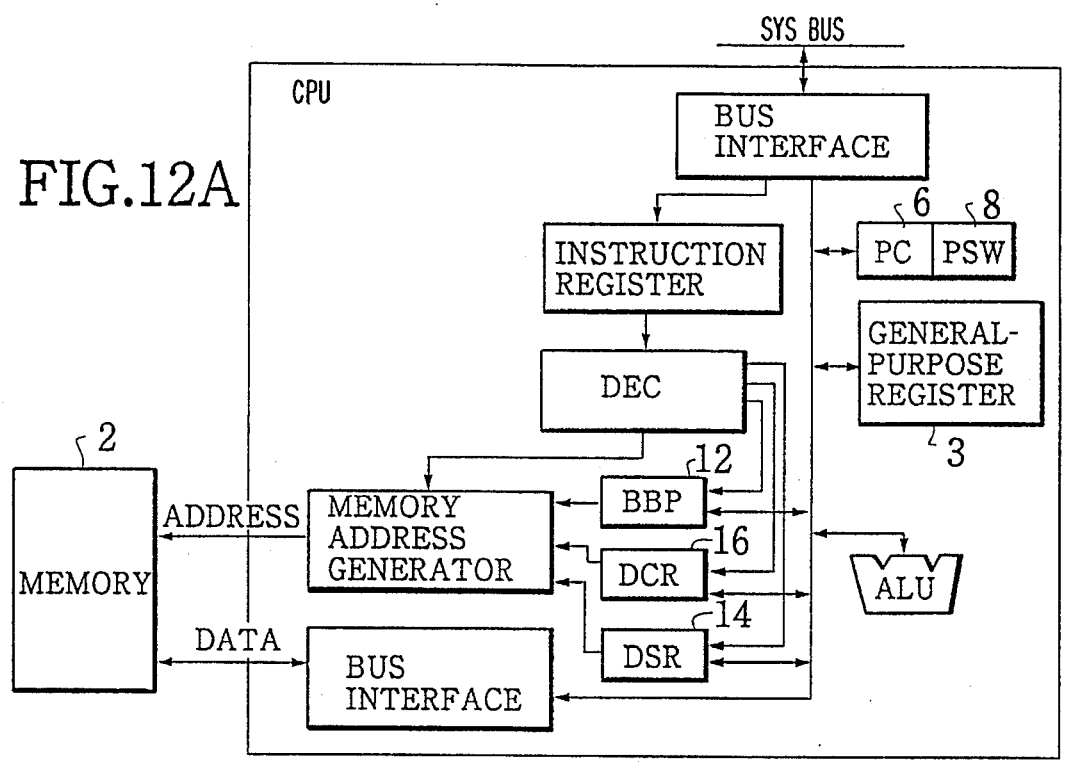
FIG.12A
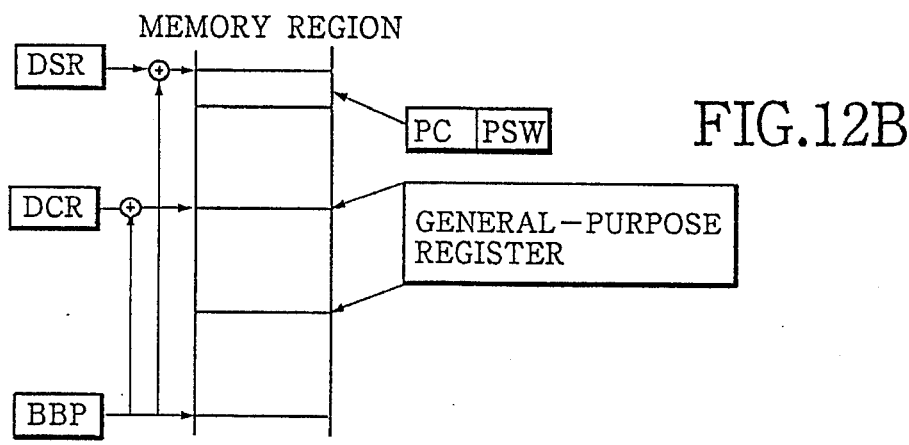
FIG.12B
STORE OF GENERAL-PURPOSE
REGISTER, PC & PSW
FIG.12C
INSTRUCTION : CBBP(#BBP),(#DSR)
          LD    DCR,(#DCR)
INTERRUPT : SPECIFY BBP, DSR
          AT MODE WORD
          (SPECIFY INITIAL VALUE
          AT DCR=0)
UPDATA OF BBP, DCR & DSR

1

HIGH-SPEED PROCESSOR FOR HANDLING MULTIPLE INTERRUPTS UTILIZING AN EXCLUSIVE-USE BUS AND CURRENT AND PREVIOUS BANK POINTERS TO SPECIFY A RETURN BANK

BACKGROUND OF THE INVENTION

1. Field of the Invention

The present invention relates to a processor having a bank structure, and it particularly relates to a processor capable of handling multiple interrupts.

2. Description of the Prior Art

The number of general-purpose registers which can be used in a central processing unit (CPU) of a microprocessor is usually limited due to a size of a semiconductor chip. Therefore, there is available a microprocessor having a bank structure.

A bank is a collection of general-purpose registers. The general-purpose registers are mainly used for an arithmetic operation. In general, general-purpose registers of a bank are stored in a space (called a bank RAM) of a predetermined size within a random access memory (RAM) region. A specific bank RAM can be selected from a plurality of bank RAMs to be a general-purpose RAM.

In a conventional microprocessor having a bank structure, switching of the banks is equivalent to having a plurality of general-purpose registers. For example, referring to FIG. 1, when there are four general-purpose registers 101 in each bank and there are a total of 256 banks in the microprocessor, it is equivalent to there being 4×256=1024 registers.

There exists a register called a bank pointer for specifying a bank number thereof when there are a plurality of banks. By changing the bank number, a content stored in another bank can be accessed.

In a microprocessor system having the conventional bank structure, there can be considered (1) a stack memory or (2) a general-purpose register in which the bank number in use can be saved when an interrupt occurs. In both the stack memory and general-purpose register configurations, even if the bank is switched due to an interrupt routine, the bank number prior to occurrence of the interrupt is read after the interrupt routine is completed so as to return to an original bank by reading the bank number.

In the microprocessor system having the conventional bank structure wherein the bank number is saved to the stack memory, in the event of an interrupt, the bank number must be written to a stack memory connected to an external bus of the microprocessor and read from the stack memory when returning from an interrupt process. This writing to and reading from the external stack memory via an external bus is very time consuming.

On the other hand, some microprocessor systems have a conventional bank structure wherein the bank number for a bank which has been used is saved to a general-purpose register after the bank is switched in the event of the interrupt. Compared to a case where the bank number is saved to the stack memory, saving to the general-purpose register is faster since a slow access to the external bus is not necessary.

However, when an interrupt process is carried out using a general-purpose register to store the bank number, there is a limit to the general-purpose registers which can be used for the interrupt process since a general-purpose register containing a bank number as return data cannot be used to execute the interrupt process. If a general-purpose register with a return data is needed, the return bank number can be saved to the stack memory, thereby yielding slower processing than if the stack memory was used from the beginning.

SUMMARY OF THE INVENTION

In view of the foregoing problems, it is therefore an object of the present invention to provide a processor where there is no limit on usable registers in the event of multiple interrupts, and to provide a processor having a high-speed response during the interrupt process.

To achieve these objects, there is provided a processor including a bank-structured memory, a central processing unit (CPU) comprising a plurality of data memories serving as general-purpose registers and bank specifying registers for specifying an address to enable saving and restoring address data without involving an external system bus that connects the CPU and a program memory used for storing a user program, wherein the bank specifying registers include a bank pointer for indicating a position in the bank containing data to be returned to the data memories after completing an interrupt process; a bank-structured memory, connected to the CPU via an exclusive-use bus, for holding data stored in the data memories using the bank specifying registers and for returning data stored in the bank structure to the data memories using the bank specifying registers.

Other features and advantages of the present invention will become apparent from the following description taken in conjunction with the accompanying drawings.

DESCRIPTION OF THE DRAWINGS

FIG. 2B shows a configuration of the processor according to a first embodiment of the present invention.

FIG. 3 shows an example of condition code.

FIG. 4 shows an example of processor status word.

FIG. 5 shows a group of registers to be saved to a bank

FIG. 6 shows an example of bank usage according to a first embodiment

FIG. 8 shows an example of bank usage according to a second embodiment.

FIGS. 10A–10C show a configuration and operation of a processor according to a third embodiment.

FIGS. 11A–11C a configuration and operation of a processor according to a fourth embodiment.

FIGS. 12A–12C show a configuration and operation of a processor according to a fifth embodiment.

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the drawings.

FIG. 2B shows a schematic configuration of a processor according to a first embodiment of the present invention.

Figure 1:
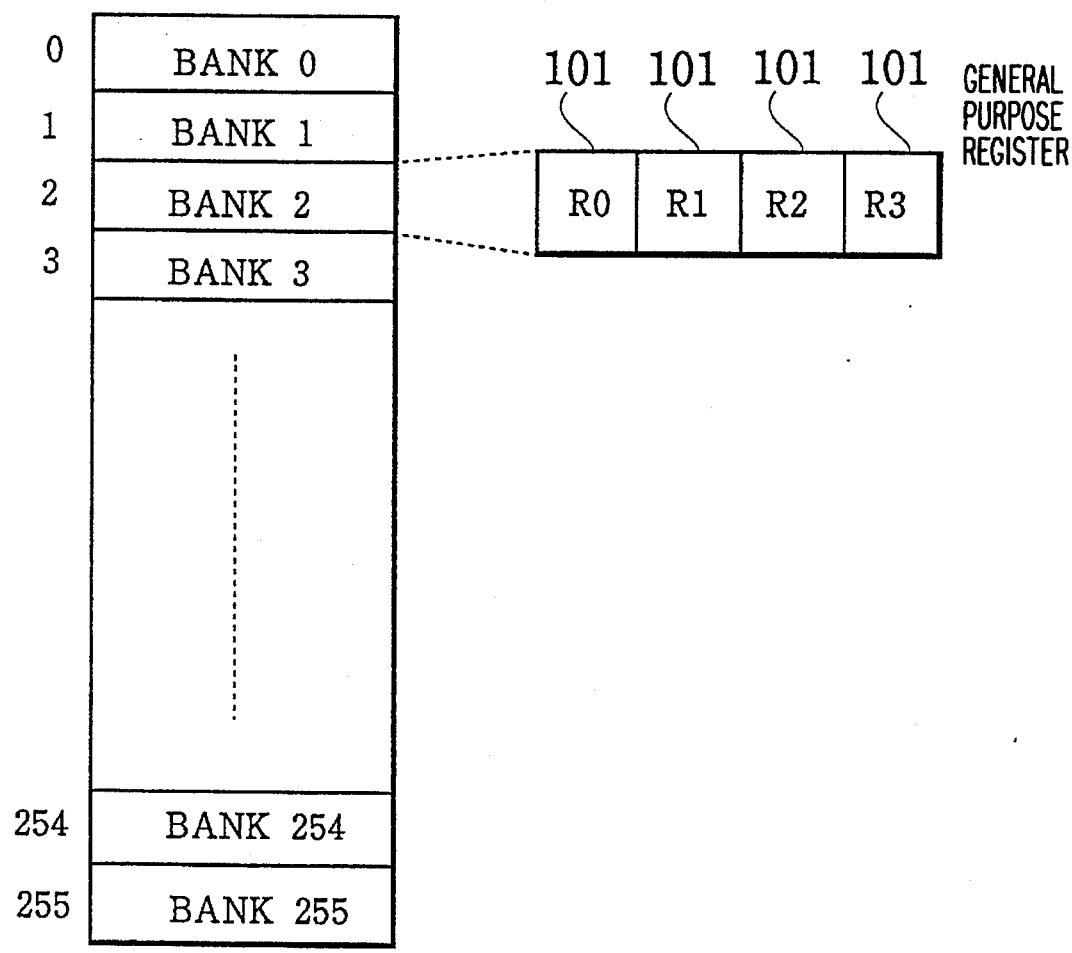
FIG. 1 shows a group of banks according to the conventional processor.
Figure 2A:
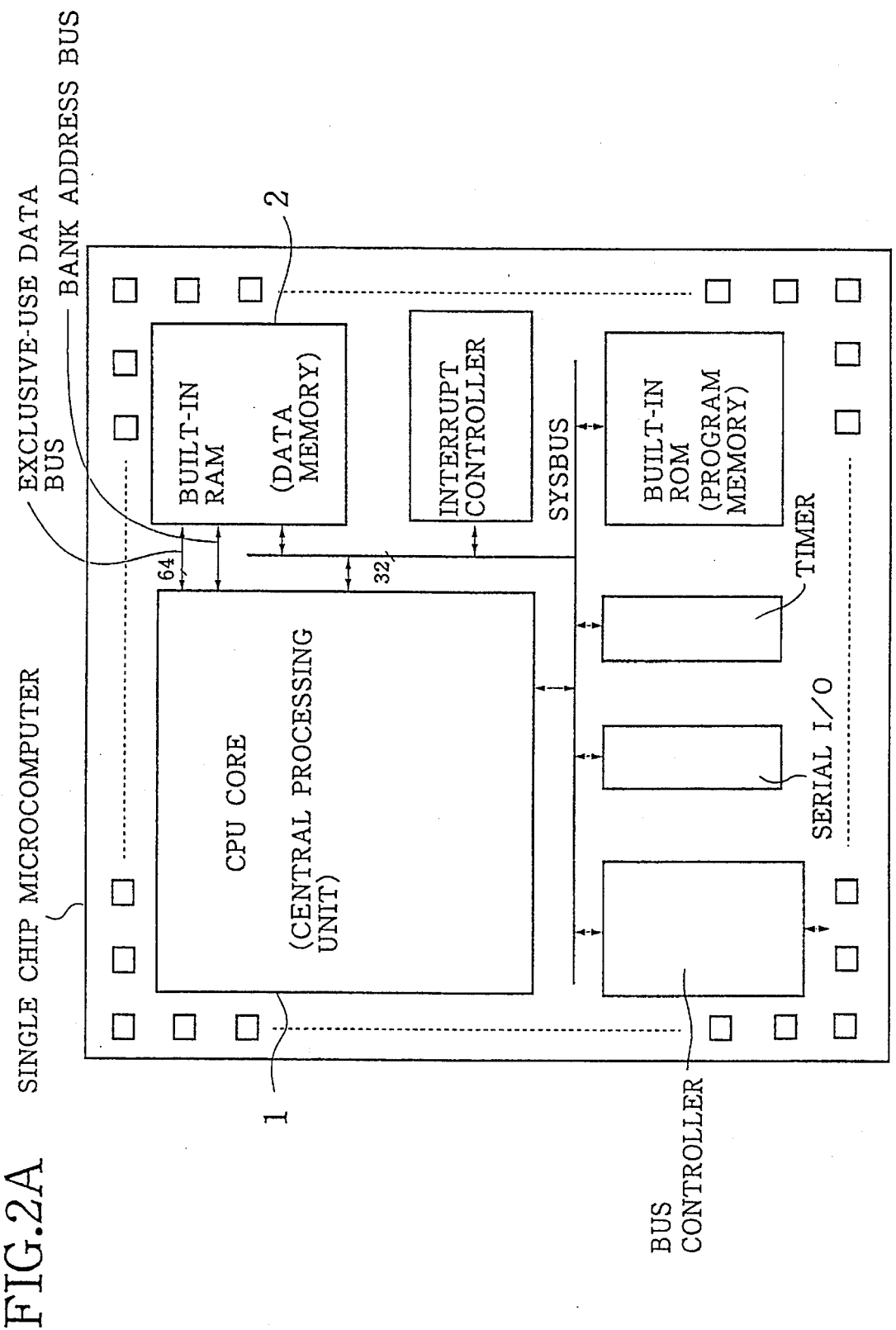
FIG. 2A shows an overall configuration of a microcomputer or processor.

Referring to FIG. 2A, there is shown an overall configuration of a single chip microcomputer comprising a central processing unit (CPU) 1, a built-in random access memory (RAM) 2 connected to the CPU via an exclusive-use bus and a bank address bus, a built-in (read only memory) ROM connected to the CPU 1 and the built-in RAM 2 via a system bus which is designated as SYSBUS in the figure and will be referred to as an external bus hereinafter, and so on. This terminology for the external bus (system bus) will be used throughout the specification. Data can be transferred to and from elements outside the chip via a bus controller so that the data is transferred between the CPU 1 and an outside-the-chip element by means of the system bus. The built-in ROM shown in FIG. 2A stores instruction words of a user program. As shown in FIG. 2A, the built-in ROM is configured in the same chip as the CPU 1, however, the built-in ROM may be fabricated on a separate chip where data can be transferred between the CPU 1 and the ROM via the system bus.

Referring to FIG. 2B, there is shown a part of the processor shown in FIG. 2A, comprising the central processing unit (CPU) 1 and a bank memory 2 provided as part of the built-in RAM. That is, FIG. 2B shows a characterizing feature of the present invention according to the first embodiment. The CPU 1 comprises a group of registers including 16-bit general-purpose registers (RW0 through RW 15), a current bank pointer (CBP) 4, a previous bank pointer (PBP) 5, a program counter (PC) 6, a user stack pointer (USP) 7, a processor status word (PSW) 8, a group of exclusive-use registers including an interrupt stack pointer (ISP) (not shown), a special stack pointer (SSP) (not shown), a condition code (CC) (not shown) and so on.

The current bank pointer (CBP) 4 is a register which indicates a position of the bank presently in use. The previous bank pointer (PBP) 5 is a register which indicates a position where a bank is to be returned after completing a process using the bank in present use. It is to be noted that when a value of PBP 5 is "0" there exists data concerning a bank position that shall be returned to a stack memory. The program counter (PC) 6 is a register where an address of a next instruction to be executed by the processor is stored, so that a value of the program counter (PC) varies when the program is running. In general, there is considered an instruction ROM (read only memory) as an instruction memory for storing instruction words of the program. However, it is also possible to utilize a portion of the built-in RAM (random access memory) for that same purpose. An instruction fetch is carried out in the following manner. An address corresponding to a content of the PC 6 is outputted to an address bus constituting the system bus. An instruction in the instruction memory specified by the address is outputted to a data bus. An instruction on the data bus is fetched into the CPU 1.

The interrupt stack pointer is a register which indicates the address of the memory region that stores values of PC 6, PSW 8, PBP 5 and USP 7 when returning from an interrupt. The user stack pointer (USP) 7 is a register which indicates the address of the memory region that stores values of PC 6, PSW 8 and PBP 5 when returning from a subroutine of a user program. The special stack pointer is a register which indicates the address of the memory region that stores values of PC 6, PSW 8 and PBP 5 when returning from a system call. The condition code is a register which stores a flag indicating a status of arithmetic result. The processor status word (PSW) 8 is a register which indicates a microprocessor status.

Referring to FIG. 3, the condition code (CC) comprises a carry flag C 21, an overflow flag V 22, a zero flag Z 23 and a sign flag S 24. The carry flag C 21, is set to "1" when a carry or borrow occurs from a most significant bit as a result of an arithmetic operation. The overflow flag V 22 is set to "1" when an overflow occurs as a result of an arithmetic operation. The a zero flag Z 23 is set to a "1" when an arithmetic result is 0. In the sign flag S 24, a value of the most significant bit of the arithmetic result is duplicated.

Referring to FIG. 4, in PSW 8 there are stored therein information on a task mode (T) 31 for specifying the stack pointer, a bank size (BS) 32 for specifying a size of bank presently in use, delayed interrupt (DI) 33 for specifying a delayed interrupt, a privilege mode (PM) 34 for specifying a privileged mode, a single step (SS) 35 for specifying a single step, an enable interrupt (EI) 36 for enabling an interrupt, an interrupt mask (IM) 37 for specifying an interrupt mask, a condition code (CC) 21 through 24 for specifying a condition coded and so on.

Referring back to FIG. 2B, the bank memory 2 is provided in a RAM (random access memory) which is built in the processor. In the bank memory 2, for example, there are provided bank 1 through bank 256, each bank comprising 4 units and therefore having a size of four words. For example, the group of sixteen general-purpose registers 3 can be allocated to four successive banks in the bank memory 2. In an embodiment to follow, the group of general-purpose registers 3 is allocated to a group of registers R0 through R15 of four successive four register banks, and the exclusive-use register comprising PC 6, PBP 5, PSW 8 and USP 7 is allocated to one bank, as shown in FIG. 5. Accordingly, the exclusive-use registers and the group of general-purpose registers 3, can transfer data by a bus such as the special bus which is distinct from the external bus (system bus), in other words, data can be transferred without using the external bus, thus improving significantly a speed of data transfer. It shall be appreciated that the wider the special bus for transferring the data, the faster the data transfer becomes. The special bus may be referred to as an exclusive-use data bus for exclusively connecting the CPU 1 and the bank memory (RAM) 2 and for saving/restoring contents of one or more of the group of general-purpose registers 3. Bank switching is performed through the exclusive-use data bus. In contrast, it is to be noted that the system bus SYSBUS represents the conventional data bus and address bus. It is also to be noted again that the terms "system bus" and "external bus" are interchangeably used throughout the specification.

Though a certain bank is being used at any time in the above configuration, when an interrupt occurs there is activated an interrupt routine which is a program for processing the interrupt which may switch the bank. Then, if the routine is directly accessed, it will be unclear as to which bank to return to at the end of the interrupt routine. Thus, PBP 5 is provided so that a position of the bank to be used after completing the process of the interrupt routine can be verified. The position of the bank to be used will be referred to as a return bank number hereinafter.

There is provided CBP 4 for verifying a position of a bank presently used. Further, when a bank switching occurs, PBP 5 is loaded with contents of CBP 4 to store the return bank number. When returning the PBP 5 is loaded with the contents of CBP 4.

Registers being used during execution of a program include the group general-purpose registers, PC 6, ISP, USP 7, SSP, CBP 4, PBP 5, CC and PSW 8.

In a bank RAM, such as the bank memory 2, there is a region (bank area) for saving the group of general-purpose registers 3, PC 6, USP 7, PSW 8 and PBP 5 as shown in FIG. 5. The bank area is divided so that a size allocated for each bank is equal. Namely, there are needed a bank for saving PBP 5, PC 6, USP 7 and PSW 8, one to four banks for saving the group of general-purpose registers used with the above the exclusive-use registers (the general-purpose registers having 4, 8, 12 or 16 registers).

When switched to a subroutine, the routine saves PBP 5, PC 6, USP 7 and PSW 8 to a stack memory (not shown). The stack memory is a list that is accessed in a last-in, first-out manner.

There are three major occasions for switching the bank, which are an interrupt process, a subroutine call and a system call.

In switching the bank by the interrupt process, when an interrupt condition is met and the interrupt occurs, an interrupt requesting signal is outputted to an interrupt control circuit. The interrupt control circuit outputs to the processor an interrupt having a highest priority among the interrupts when two or more interrupts are received simultaneously. When such interrupt has a higher priority than a currently performed process which is authorized to be interrupted, the interrupt is accepted and an interrupt authorizing signal is outputted to the interrupt control circuit. In case of a non-maskable interrupt from outside of a chip, when a priority thereof is higher than the currently performed process, the interrupt is accepted and the interrupt authorizing signal is outputted regardless of whether the interrupt is authorized or not.

Then, the interrupt control circuit receives the interrupt authorizing signal so as to generate a vector responsive to a request, and the processor calculates a start address for the interrupt process based on the vector so as to write a value thereof into PC 6.

At a start of the interrupt process one word written in the start address is read. In the one word, whether or not the bank shall be switched and the bank number to be switched are set up by a program. The one word is called an interrupt mode word.

When switching the bank, content of the currently used bank (the group of general-purpose registers 3, PC 6, PSW 8, USP 7 and PBP 5) is saved to the bank RAM. PBP 5 is loaded with content of CBP 4. A bank which will be used for the interrupt process is stored at CBP 4. The group of general-purpose registers is loaded from the bank RAM specified by the bank number so as to switch the bank and start the interrupt process.

Next, in case of bank switching by a subroutine call, the subroutine is called by a CALL instruction in a program of a user. The PC 6 and PBP 5 of presently used bank are saved to a stack memory specified by the USP 7, so that the PBP which is thus saved is set to "0" and the CBP 4 remains unchanged. Then, an address specified by the CALL instruction is written to the PC 6 so as to start the subroutine process.

In the subroutine, the bank is not switched. When the bank is intended to be switched, the bank can be switched by a CHGBK instruction (change bank instruction) of the program. Then, the group of general-purpose registers alone is saved to the bank RAM and a new bank number is written to the CBP 4. Though the bank is changed, the PBP 5 is unaffected. Referring to FIG. 6, when a bank is within three banks from a first bank at the time of the bank switching, parameters can be passed therebetween and a result thereof can be received. On the other hand, when moved by 4 or more banks, the bank is switched such that there is no overlapping.

In case of bank switching by a system call, the interrupt is received regardless of whether the interrupt is authorized or not since the system call is a software interrupt and is a non-maskable interrupt. A vector responsive to the interrupt process is generated by the interrupt control circuit, and the start address of the interrupt process is calculated based on the vector. At the same time, the PC 6, PBP 5 and PSW 8 used by the interrupted process are written to the stack memory. Now that the stack memory is written the PBP is set to "0".

Thereafter, the calculated start address is written to the PC 6. In the system call, the bank is not switched automatically unlike a normal interrupt process, instead, the bank is switched by the program. The bank switching is performed by the CHGBK instruction.

First, the group of general-purpose registers alone is saved to the bank RAM, and a new bank number is written to the CBP 4. At this time, the content of PBP 5 is not renewed. Then, a process for the system call is carried out. Similar to the subroutine call, when the bank is moved within three banks, parameters can be passed therebetween.

In order to recover from the interrupt-caused bank switching, an initial bank is recovered by a RTI instruction (return instruction from the interrupt) after the interrupt process is completed. The CBP 4 is loaded with content of PBP 5 and then the group of general-purpose registers 3, PC 6, PBP 5, PSW 8 and USP 7 are loaded from the bank RAM specified by the CBP 4 so as to recover to the initial bank. Now, in a case where the content of the group of general-purpose registers and so on used in the interrupt process need to be stored when the same interrupt may occur again in the near future, the program may instruct that such content be written back to the bank RAM before recovering.

In order to recover from the subroutine-caused bank switching, an initial bank is returned by the CHGBK instruction after the subroutine process is completed. The value of CBP 4 prior to bank switching by the program is written to the CBP 4, and the group of general-purpose registers 3 alone is loaded from the bank RAM specified by the CBP 4 so as to return to the initial bank. Then, an initial routine is recovered by a RET instruction (return instruction from the subroutine) The PBP 5 being set to "0", the PC 6 and PBP 5 are loaded from the stack memory specified by the USP 7. Then, if an overlap between general-purpose register groups is set, parameters such as a result of the subroutine can be passed therebetween.

In order to recover from the bank switching caused by the system call, an initial bank is recovered by the CHGBK instruction after the system call process is completed. The value of CBP 4 prior to bank switching by the program is written to the CBP 4, and the group of general-purpose registers 3 alone is loaded from the bank RAM specified by the CBP 4 so as to return to the initial bank. The initial routine is recovered by a RTI instruction (return instruction from the interrupt routine). The PBP 5 being set to "0", the PC 6, PBP 5 and PSW 8 are loaded from the stack memory specified by the USP 7, so as to return to the initial routine.

When switching the bank by the subroutine call or system call, the parameters can be passed to a switched register bank as mentioned before. If the bank number is set in a manner that the banks of the general-purpose registers overlap, the parameters in the general-purpose registers can be passed therebetween. Namely, the parameters can be passed between the general-purpose registers in the area overlapped. Thereby, a process time will be less than in such a case for using the stack memory and so on. It is to be noted that a register bank number of an initial register bank differs from that of a new register bank, when the parameters are passed.

Figure 7:
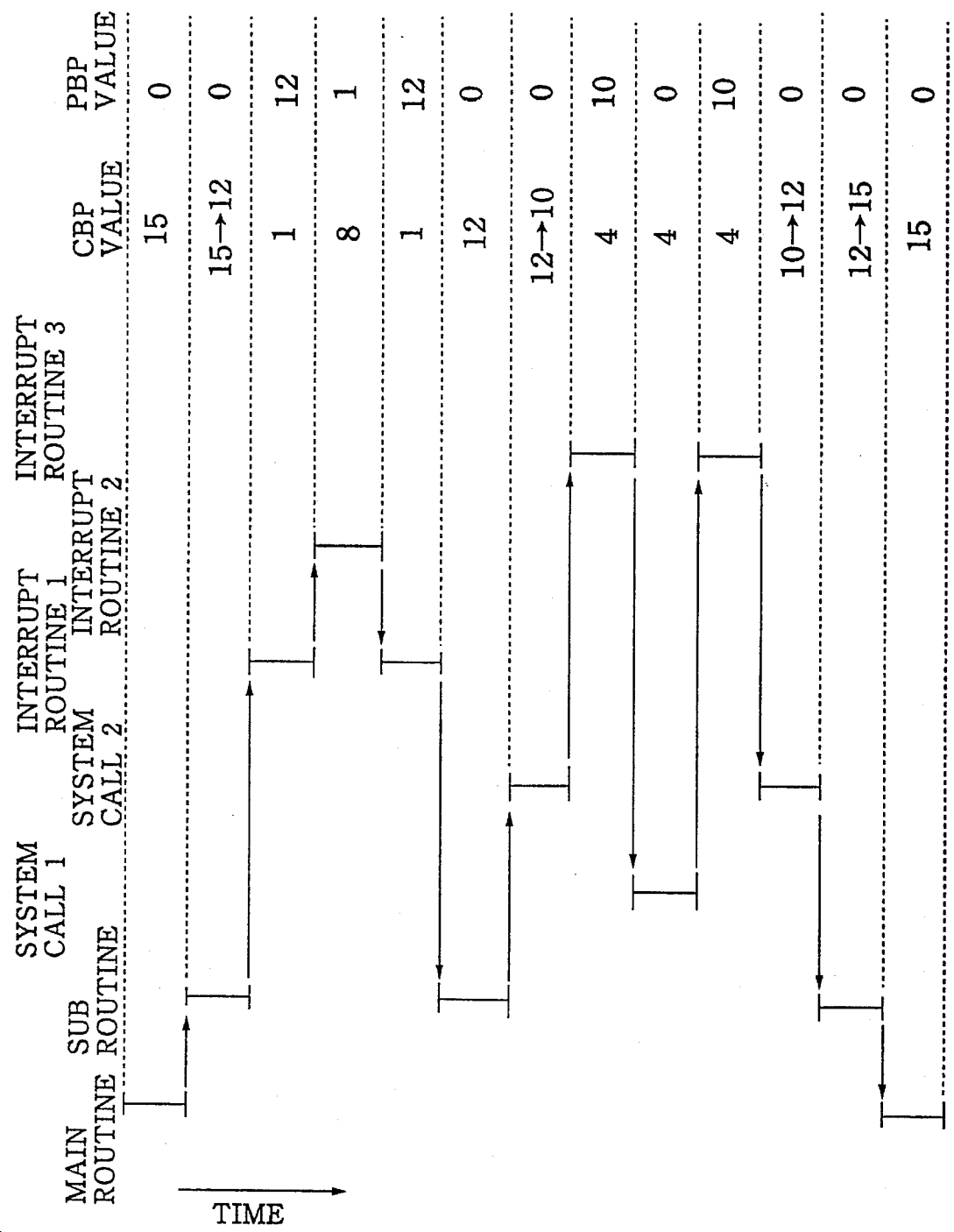
FIG. 7 shows a diagram showing a sequential process for bank switching.

Referring to FIG. 6 and FIG. 7, an embodiment for switching the bank will be described.

FIG. 6 shows an example of bank usage and FIG. 7 shows a diagram showing a sequential process for the bank switching.

In the same figures, the bank is not switched in system call 1, and subroutine 2 (FIG. 6) corresponds to system call 2 (FIG. 7). When the PBP 5 in use is set to "0", it is indicated that the PC 6, PBP 5 and PSW 8 are saved at the stack memory.

First, a main routine is executed. Then, there are inputted a bank number in use that is 15 in the CBP 4, and value "0" in the PBP 5 being initialized. Bank 15 in the bank RAM stores the PC 6, PBP 5, USP 7 and PSW 8 while bank 16 through bank 19 store the group of general-purpose registers 3.

Next, when subroutine call 1 is called, the PC 6 and PBP 5 of the bank which has been used are saved to the stack memory, thus setting the PBP 5 and "0". A program address specified by the subroutine call instruction is set to the PC 6. The bank to be used is switched from 15 to 12 by the program. The content of the general-purpose register group 3 which has been used is saved to bank 16 through bank 19. The CBP 4 is set to "12" and the values of banks 13 through 16 are loaded to the general-purpose register group. The parameters in registers R0 through R3 of bank 16 which has been previously used in the main routine can be directly passed to R12 through R15 of the subroutine 1.

Then, when interrupt routine 1 occurs, the one word set previously by the program at the time of start of routine 1 is read so as to read a bank number and size which will be used in the interrupt routine 1. Simultaneously, the general-purpose register group of the subroutine 1 is saved to bank 13 through bank 16, and the PC 6, PSW 8, USP 7 and PBP 5 are saved to bank 12 and the PBP 5 is loaded with the context of CBP 4.

The start address responsive to the interrupt routine 1 is written to the PC 6, and the content of bank 1 which will be used in the interrupt routine 1 is written to the CBP 4, so as to switch the bank. The general-purpose register group is loaded from bank 2 and bank 3.

Next, when interrupt routine 2 occurs, the one word set previously by the program at the time of start of the routine is read so as to read a bank number and size which will be used in the interrupt routine 2 in a similar manner with the interrupt routine 1. Simultaneously, the general-purpose register group of the interrupt routine 1 is saved to bank 2 and bank 3, and the PC 6, PSW 8, USP 7 and PBP 7 are saved to bank 1, with the PBP 5 of bank 1 having the content of CBP 4.

The start address responsive to the interrupt routine 2 is written to the PC 6, and the content of bank 8 which will be used in the interrupt routine 2 is written to the CBP 4, so as to switch the bank. The general-purpose register group is loaded from bank 9, thus being made available.

When a process for the interrupt routine 2 is completed, a return instruction from the interrupt routine 2 is generated and CBP 4 is loaded with value "1" of the PBP 5. The PC 6, PBP=12, PSW 8 and USP 7 are loaded from the bank 1, and the general-purpose register group is loaded from the bank 2 and bank 3. Then the process for interrupt routine 1 is continued.

Thereafter, when the process for the interrupt routine 1 is completed, a return instruction from the interrupt routine 1 is generated and CBP 4 is loaded with value "12" of the PBP 5 in a similar manner as the interrupt routine 2 is completed. The PC 6, PBP=0, PSW 8 and USP 7 are loaded from the bank 12, and the general-purpose register group is loaded with the bank 13 through bank 16. Then, the process for the subroutine 1 is continued.

Thereafter, when system call 2 occurs during the process for the subroutine 1 and is received, the PC 6, PSW 8 and PBP=0 which have been used in the subroutine 1 are saved to the stack memory. Then, the start address responsive to the software interrupt routine is written to the PC 6.

Since the software interrupt does not automatically switch the bank, the value of CBP 4 remains as 12. Data are saved to the stack memory, thus PBP being set to "0". The bank is switched by the program so as to set the CBP to "10". The general-purpose register group is loaded from the bank 11 and bank 12, thus being made available.

Thereafter, when interrupt routine 3 occurs during the process for the system call 2, the one word set previously by the program at the time of start of the routine is read so as to read a bank number and size which will be used in the interrupt routine 3 in a similar manner as the interrupt routine 2. Simultaneously, the general-purpose register group of the system call 2 is saved from bank 11 to bank 12, and the PC 6, PSW 8, USP 7 and PBP=0 are saved to bank 10 and the PBP 5 with the bank 10 is loaded with the content of CBP 4.

The start address responsive to the interrupt routine 3 is written to the PC 6 and the content of bank 4 which will be used in the interrupt routine 3 is written to the CBP 4, so as to switch the bank. The general-purpose register group is loaded from bank 5 through bank 7, thus being made available.

Thereafter, when the system call 1 occurs during the process for the interrupt routine 3 and is received, the PC 6, PSW 8 and PBP=10 which have been used in the interrupt routine 3 are saved to the stack memory. Then, the start address responsive to the software interrupt routine is written to the PC 6.

Since the software interrupt does not automatically switch the bank, the value of the CBP 4 remains unchanged. Since data are saved to the stack memory, the PBP is set to "0". Since the system call 1 does not switch the bank, the CBP remains as 4 and the general-purpose register group uses the bank 5 through bank.

Thereafter, when the process for the system call 1 is completed, the interrupt routine 3 is recovered by the return instruction from the interrupt The PBP being set at "0", the PC 6, PSW 8 and PBP=10 which have been used in the interrupt routine 3 are loaded from the stack memory. The bank being not switched, the CBP remains as 4 and the general purpose register group uses the bank 5 through bank 7 and resumes the process for the interrupt routine 3.

Thereafter, when the process for the interrupt routine 3 is completed, a return instruction from the interrupt routine 3 is generated and the CBP 4 is loaded with value 10 of PBP 5. The PC 6, PBP=0, PSW 8 and USP 7 are loaded from the bank 10, and the general-purpose register group is loaded from the bank 11 and bank 12. Then, the process for system call 2 is continued.

Thereafter, when the process for the system call 2 is completed, the CBP is loaded with the bank 12 by the bank change instruction of the program so as to be recovered to the bank 12. The PBP being set at "0", the PC 6, PBP=0 and PSW 8 are loaded from the stack memory. The general-register group is loaded with bank 13 through bank 16 so as to perform again the process for the subroutine 1.

When the process for the subroutine 1 is completed, the CBP 4 is loaded with bank 15 by the program The PBP being set at "0", the PC 6 and PBP=0 are loaded from the stack memory. The general-purpose register group is loaded with the bank 16 through bank 19 so as to resume the main routine.

It shall be appreciated that there may be provided a register which stores values of both CBP and PBP. Accordingly, by employing the present invention, there is no need to access the stack memory through the slow external bus in the event of accessing the return bank number, thus realizing a high-speed response to the interrupt.

Moreover, there is no need to provide a plural set of exclusive-use registers such as PC and PSW, thus multiple interrupts can be handled with ease and high-speed access (save/restore) response is achieved.

Moreover, a location can be selected for storing the return bank number according to the values of a register which holds the return bank number, it is possible to place the return bank number in the external stack memory when the interrupt in question does not particularly require a fast response, thus the internally located bank RAM can be utilized most efficiently. For example, when the second interrupt occurs which uses the same general-purpose register as the first interrupt while the first interrupt is responding, the PC and PSW which will be used in the second interrupt are written to bank memory, and the PC and PSW which have been used in the first interrupt can be saved to the stack memory, thus economizing the bank memory.

Next, the second embodiment according to the present invention will be described.

The second embodiment is characterized in that one bank will be used for storing the return bank number instead of using the PBP for that purpose as described in the first embodiment.

Referring to FIG. 5, the one bank comprises four registers, and bank 1 through bank 4 are used as general purpose registers. A bank is used for saving the PC 6, PSW 8 and USP 7.

Although a certain bank is being used at any time, when an interrupt occurs there is activated an interrupt routine which is a program for processing the interrupt which may switch the bank. Then, if the routine is directly accessed, it will be unclear as to which bank to return at the conclusion of the interrupt routine. Thus, accessed is the bank RAM for storing the return bank number. Moreover, CBP 4 is provided so that the number or position of the bank presently in use can be verified. When a bank switching occurs, a bank position to be returned after completing a process of the interrupt can be saved by loading the bank Ram with the CBP 4. Conversely, when CBP 4 is loaded, the bank can be returned for use.

On the other hand, when switched to a subroutine, the switched routine saves the PC 6, USP 7 and PSW 8 to the last-in first-out stack memory.

There are three major occasions for switching the bank, which are an interrupt process, a subroutine call and a system call.

In switching the bank by the interrupt process, when an interrupt condition is met and the interrupt occurs, an interrupt requesting signal is outputted to an interrupt control circuit. The interrupt control circuit outputs to the processor an interrupt having a highest priority among the interrupts when two or more interrupts are received simultaneously. When such interrupt has a higher priority than a currently performed process which is authorized to be interrupted, the interrupt is accepted and an interrupt authorizing signal is outputted to the interrupt control circuit. In case of a non-maskable interrupt from outside of a chip, when a priority thereof is higher than the currently performed process, the interrupt is accepted and the interrupt authorizing signal is outputted regardless of whether the interrupt is authorized or not.

Then, the interrupt control circuit receives the interrupt authorizing signal so as to generate a vector responsive to a request, and the processor calculates a start address for the interrupt process based on the vector so as to write a value thereof into PC 6.

At a start of the interrupt process one word written in the start address is read. In the one word, whether or not the bank shall be switched and the bank number to be switched are set up by a program.

When switching the bank, content of the currently used bank (the group of general-purpose registers 3, PC 6, PSW 8, USP 7 and PBP 5) is saved to the bank RAM. PBP 5 is loaded with content of CBP 4. A bank which will be used for the interrupt routine is loaded with the content of CBP 4 as a return bank number, and the bank number to be used for the interrupt routine is written to the CBP 4. The general-purpose registers group 3 is loaded from the bank RAM specified by the bank number so as to switch the bank and start the interrupt process.

Next, in case of bank switching by a subroutine call, the subroutine is called by a CALL instruction in a program of a user. The PC 6 of presently used bank is saved to a stack memory specified by the USP 7, so that the return bank number in the bank is set to "0" (since data are saved to the stack memory) and the CBP 4 remains unchanged. Then, an address specified by the CALL instruction is written to the PC 6 so as to start the subroutine process.

When the bank is switched by the program, the bank can be switched by a CHGBK instruction (bank changing instruction) of the program. Then, the general-purpose register group alone is saved to the bank RAM and a new bank number is written to the CBP. Though the bank is changed, the PBP 5 is unaffected. The process for the routine is continued. Referring to FIG. 8, when a bank is moved within three banks from a first bank at the time of the bank switching, parameters can be passed therebetween and a result thereof can be received. On the other hand, when moved by 4 or more banks, the bank is switched such that there is no overlapping.

In case of bank switching by a system call, the interrupt is received regardless of whether the interrupt is authorized or not since the system call is a software interrupt and is a non-maskable interrupt. A vector responsive to the interrupt process is generated by the interrupt control circuit, and the start address of the interrupt process is calculated based on the vector. At the same time, the PC 6, PBP 5 and PSW 8 used by the interrupted routine are written to the stack memory. Now that the stack memory is written the return bank number is set to "0".

Thereafter, the calculated start address is written to the PC 6. In the system call, the bank is not switched automatically unlike in a normal interrupt routine, instead, the bank is switched by the program. The bank switching is performed by the CHGBK instruction. First, the general-purpose register group alone is saved to the bank RAM, a new bank number is written to the CBP 4. The PBP is unaffected. Then, a process for the routine is carried out. Similar to the subroutine call, when the bank is moved within three banks, parameters can be passed therebetween and the result thereof can be received.

In order to recover from the interrupt-caused bank switching, an initial bank is recovered by a RTI instruction (return instruction from the interrupt) after the interrupt process is completed. The CBP 4 is loaded with the content of the return bank number and then the general-purpose register group 3, PC 6, PSW 8 and USP 7 are loaded from the bank Ram specified by the CBP 4 so as to recover to the initial bank. Now, in a case where the content of the general-purpose register group and so on used in the interrupt routine need to be stored when the same interrupt may occur again in the near future, the program may instruct that such content be written back to the bank RAM before recovering.

In order to recover from the subroutine-caused bank switching, an initial bank during the subroutine is returned by the CHGBK instruction after the subroutine process is completed. The value of CBP 4 prior to bank switching by the program is written to the CBP 4, and the general-purpose register 3 alone is loaded from the bank RAM specified by the CBP 4 so as to return to the initial bank. Then, an initial routine is recovered by a RET instruction (return instruction from the subroutine). The return bank number being set to "0", the PC 6 is loaded from the stack memory specified by the USP 7. Then, when an overlap by bank is set to 1–3, a result thereof can be passed therebetween.

In order to recover from the bank switching caused by the system call, an initial bank is recovered by the CHGBK instruction after the system call process is completed. The value of CBP 4 prior to bank switching by the program is written to the CBP 4, and the general-purpose register group 3 alone is loaded from the bank RAM specified by the CBP 4 so as to recover to the initial bank. The initial routine is recovered by a RTI instruction (return instruction from the interrupt routine). The return bank number being set to "0", the PC 6 and PSW 8 are loaded from the stack memory specified by the USP 7, so as to return to the initial routine.

Figure 9:
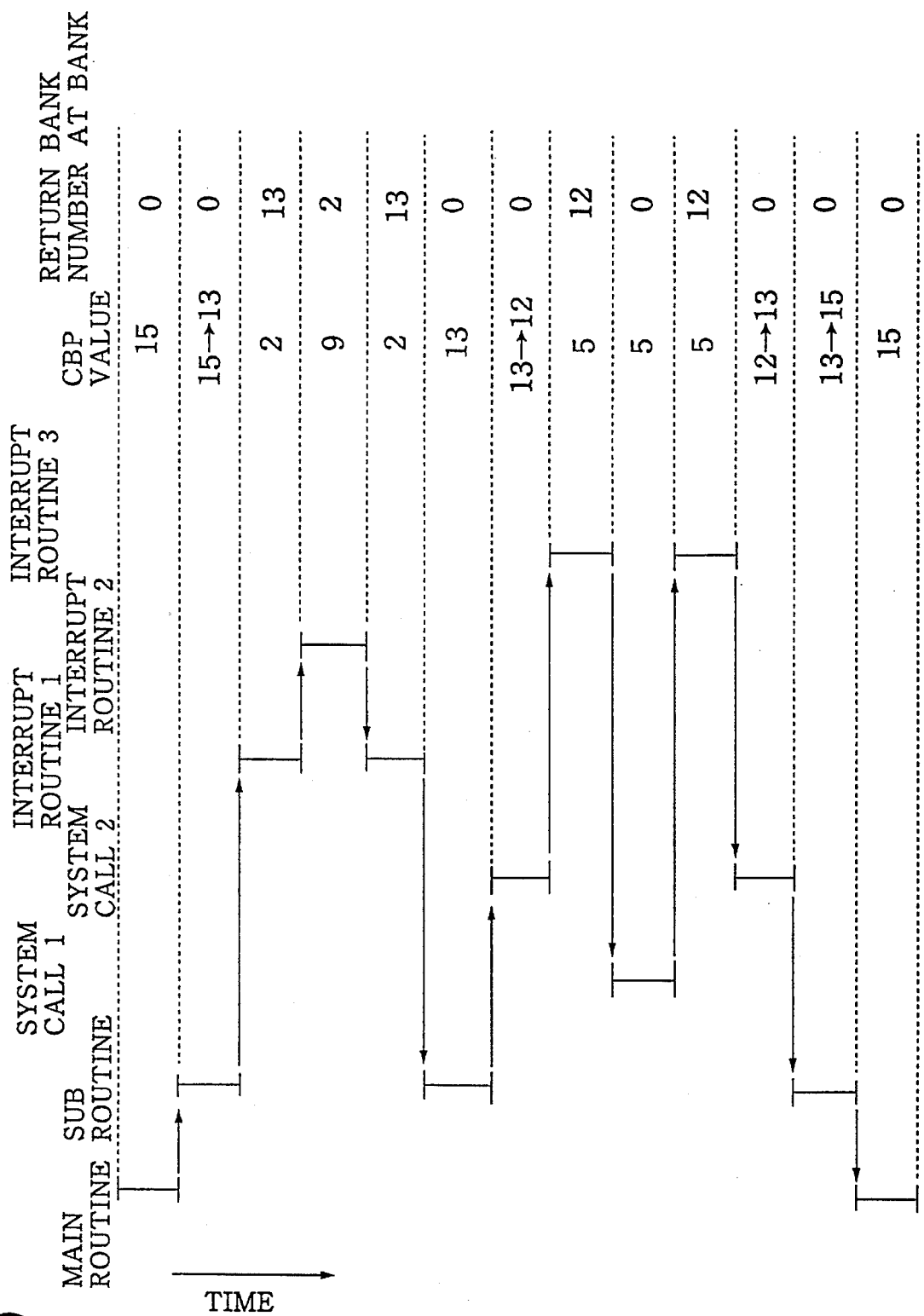
FIG. 9 shows a diagram showing a sequential process for the bank switching shown in FIG. 8.

Referring to FIG. 8 and FIG. 9, described is an embodiment for switching the bank to specify a bank storing a value of the CBP-specified bank position to be used after completing the process.

FIG. 8 shows an example of bank usage and FIG. 9 shows diagram showing a sequential process for the bank switching.

In the same figures, the bank is not switched in system call 1, and subroutine 2 (FIG. 8) corresponds to system call 2 (FIG. 9). Return is made to the bank whose value is one less than a value of CBP 4. When the return bank number is "0", it is indicated that the PC 6 and PSW 8 are being saved to the stack memory.

Referring to FIG. 8 and FIG. 9, first, a main routine is executed. Then, there are inputted a bank number in use that is 15 in the CBP 4, and the value "0" is initialized in the return bank number in bank 14. Bank 15 in the bank RAM stores the PC 6, USP 7 and PSW 8 while bank 16 through bank 19 in the bank RAM store the general-purpose register group 3.

Next, when subroutine call 1 is called, the PC 6 of the bank which has been used and the return bank number in the bank 14 are saved to the stack memory, thus setting the return bank number in the bank 14 to "0". A program address specified by the subroutine call instruction is set to the PC 6. The bank to be used is switched from 15 to 13 by the program. The context of the general-purpose register group 3 which has been used is saved to bank 16 through bank 19. The bank 12 is loaded with the value "0" of the return bank number in the bank 14. The CBP 4 is set to "13" and the general-purpose register group is loaded with the values of banks 14 through 16. The parameters in registers R0 through R3 of bank 16 which has been previously used in the main routine can be directly passed to R8 through R11 of the subroutine 1.

Then, when interrupt routine 1 occurs, the one word set previously by the program at the time of start of routine 1 is read so as to read a bank number and size which will be used in the interrupt routine 1. Simultaneously, the general-purpose register group of the subroutine 1 is saved to bank 14 through bank 16, and the PC 6, PSW 8 and USP 7 are saved to bank 13.

The start address responsive to the interrupt routine 1 is written to the PC 6, and the content of bank 2 which will be used in the interrupt routine 1 is written to the CBP 4, so as to switch the bank. The general-purpose register group is loaded from bank 3, thus making general-purpose register group 3 available.

Next, when interrupt routine 2 occurs, the one word set previously by the program at the time of start of the routine is read so as to read a bank number and size which will be used in the interrupt routine 2 in a similar manner with the interrupt routine 1. Simultaneously, the general-purpose register group of the interrupt routine 1 is saved to bank 3, and the PC 6, PSW 8 and USP 7 are saved to bank 2.

The start address responsive to the interrupt routine 2 is written to the PC 6, and the content of bank 9 which will be used in the interrupt routine 2 is written to the CBP 4, so as to switch the bank. The general-purpose register group is loaded from bank 10, thus being made available.

When a process for the interrupt routine 2 is completed, a return instruction from the interrupt routine 2 is generated and CBP 4 is loaded with value "2" of the return bank number in bank 8. The PC 6, PSW 8 and USP 7 are loaded from the bank 2, and the general-purpose register group is loaded from the bank 3 so as to recover to the initial bank. There is inputted "13" in the return bank number located in bank 1. Then the process for interrupt routine 1 is continued.

Thereafter, when the process for the interrupt routine 1 is completed, a return instruction from the interrupt routine 1 is generated and CBP 4 is loaded with value "13" of the return bank number in bank 1 in a similar manner as the interrupt routine 1 is completed. The PC 6, PSW 8 and USP 7 are loaded from the bank 13, and the general purpose register group is loaded with the bank 14 through bank 16 so as to recover to the initial bank. There is inputted "0" in the return bank number located in bank 12. Then, the process for the subroutine 1 is continued.

Thereafter, when system call 2 occurs during the process for the subroutine 1 and is accepted, the PC 6, PSW 8 and the return bank number=0 (in bank 12) which have been used in the subroutine 1 are saved to the stack memory. Then, the start address responsive to the software interrupt routine is written to the PC 6.

Since the software interrupt does not automatically switch the bank, the value of CBP 4 remains as 13. Data are saved to the stack memory, thus the return bank number in bank 12 being set to "0". The bank is switched by the program so as to set the CBP to "12" from "13". Bank 11 is loaded with "0" of the return bank number which was in the bank 12. The general-purpose register group is loaded from the bank 13, thus making bank 13 available.

Thereafter, when interrupt routine 3 occurs during the process for the system call 2, the one word set previously by the program at the time of start of the routine is read so as to read a bank number and size which will be used in the interrupt routine 3 in a similar manner as the interrupt routine 2. Simultaneously, the general-purpose register group of the system call 2 is saved to bank 13, and the PC 6, PSW 8 and USP 7 are saved to bank 12 so as to load the return bank number in bank 4 with the bank 12 having the content of CBP 4.

The start address responsive to the interrupt routine is written to the PC 6 and the content of bank 5 which will be used in the interrupt routine 3 is written to the CBP 4, so as to switch the bank. The general-purpose register group is loaded from bank and bank 7, thus being made available.

Thereafter, when the system call 1 occurs during the process for the interrupt routine 3 and is accepted, the PC 6, PSW 8 and the return bank number=12 (in bank 4) which have been used in the interrupt routine 3 are saved to the stack memory. Then, the start address responsive to the software interrupt routine is written to the PC 6.

Since the software interrupt does not automatically switch the bank, the value of the CBP 4 remains unchanged as being 5. Since data are saved to the stack memory, the return bank number in the bank 4 is set to "0". The general-purpose register group uses the bank 6 and bank 7.

Thereafter, when the process for the system call 1 is completed, the interrupt routine 3 is recovered by the return instruction from the interrupt. The return bank number in bank 4 being set at "0", the PC 6 and PSW 8 which have been used in the interrupt routine 3 are loaded from the stack memory, and the bank 4 is loaded with "12" of the return bank number. The bank being not switched, the CBP remains as being 5 and the general-purpose register group uses the bank 6 and bank 7 and resumes the process for the interrupt routine 3.

Thereafter, when the process for the interrupt routine 3 is completed, a return instruction from the interrupt routine 3 is generated and the CBP 4 is loaded with value 12 of the return bank number in bank 4. The PC 6, PSW 8 and USP 7 are loaded from the bank 12, and the general-purpose register group is loaded from the bank 13 so as to be recovered to the initial bank 12. There is inputted "0" in the return bank number located in bank 11. Then, the process for system call 2 is continued.

Thereafter, when the process for the system call 2 is completed, the CBP is changed from 12 to 13 by the bank change instruction of the program so as to be recovered to the bank 13. The bank 12 is loaded with "0" of the return bank number in the bank 11. The return bank number in bank 12 being set at "0", the PC 6, PSW 8 and "0" of the return bank number in the bank 12 are loaded to the bank 13 from the stack memory. The general-register group is loaded with bank 14 through bank 16 so as to perform again the process for the subroutine 1.

When the process for the subroutine 1 is completed, the CBP 4 is changed from 13 to 15 by the program so as to return the bank 15. The bank 14 is loaded with "0" of the return bank number in the bank 12. The return bank number in the bank 14 being set at "0", the PC 6 and "0" of the return bank number in the bank 14 are loaded to the bank 15 from the stack memory. The general-purpose register is loaded with the bank 16 through bank 19 so as to resume the main routine.

As demonstrated above in the second embodiment, the content which is supposed to be saved in the PBP as in the first embodiment is arranged to be directly transferred to the bank memory 2 without providing the PBP as in the first embodiment, and this second embodiment can give rise to the same significant effects as in the first embodiment. In the second embodiment, construction of the processor is further simplified since there is no absolute need to secure a space for the PBP.

Overall, by employing the present invention, there is no need to access the stack memory through a slow external bus in the event of accessing the return bank number, thus realizing a high-speed response against the interrupt.

Moreover, there is no need to provide a plural set of exclusive-use registers such as PC and PSW, thus multiple interrupts can be handled with ease and high-speed access (save/restore) response is achieved.

Moreover, the region in which the content of the exclusive-use registers is saved is so selective that the bank memory can be utilized efficiently.

In order to further improve the above second embodiment, there are shown the third through fifth embodiments with reference to FIGS. 10A through 12C.

FIG. 10A shows a configuration of the processor according to the third embodiment of the present invention.

The feature of the third embodiment lies in that there is provided a special bank pointer (SBP) 10 for specifying a bank which saves the PC 6 and PSW 8. In other words, the bank pointer comprises the SBP and the CBP. FIG. 10B and FIG. 10C explain operational aspects of the third embodiment. The CBP 4 and SBP 10 make an update possible by either an instruction or an interrupt. When updating by an instruction, there will be needed an exclusive-use instruction capable of updating both CBP 4 and SBP 10 simultaneously. Such an exclusive-use instruction can be named as a CCBP (change current bank pointer) instruction. There are needed both the CBP 4 and SBP 10 as an operand for the CCBP instruction. Though it is possible to update CBP 4 and SBP 10 separately by a load instruction or the like, an interrupt will be prohibited during updating of both the CBP 4 and the SBP 10. When updating by the interrupt, new values of CBP 4 and SBP 10 shall be inputted in the interrupt mode word of an interrupt table.

Next, when an interrupt occurs while a register exceeding a full capacity of the general-purpose register group 3 it utilized, an operation according to the third embodiment will be described with reference to FIG. 10B and FIG. 10C.

The CBP 14 and SBP 10 are initialized by the interrupt mode word for the interrupt and by the CCBP instruction for a task change. When register space which exceeds the full capacity of the general-purpose register group 3 is needed in an interrupt process or task, the CBP 4 is updated by the load instruction or the like so as to update a content of the general-purpose register group 3. If another interrupt then occurs, the content of the general-purpose register 3 is saved to a bank specified by the CBP 4, and the PC 6 and PSW 8 are saved to a bank specified by the SBP.

With reference to FIGS. 11A–11C, a fourth embodiment will be described.

The feature of the fourth embodiment lies in that there are provided a base bank pointer (BBP) 12 and a distance-to-special- register (DSR) 14. The BBP 12 is a pointer for specifying a bank of a base position in a work region of the register. The DSR 14 is a register for storing a relative value between the BBP 12 and a bank to which the PC 6 and PSW 8 are saved in the event of the interrupt. With reference to FIG. 11B and FIG. 11C, an operation based on the fourth embodiment will be described. The CBP 4, BBP 12 and DSR 14 can be updated by either an instruction or an interrupt. When updating by an instruction, there will be needed an exclusive-use instruction for simultaneously updating the CBP 4, BBP 12 and DSR 14. Such instruction may be named a CBBP (change base bank pointer) instruction. The BBP 12 and DSR 14 are specified as an operand for the CBBP instruction, and the CBP 4 is loaded with the same value for the BBP 12. When updating by the interrupt, new values of BBP 12 and DSR 14 shall be inputted in the interrupt mode word of the interrupt table.

When the interrupt occurs while a register exceeding the full capacity of the general-purpose register group 3 is utilized, an operation according to the fourth embodiment will be described.

The BBP 12, CBP 4 and DSR 14 are initialized by the interrupt mode word in the event of the interrupt and are initialized by the CBBP instruction in the event of the task change. When register space exceeding the full capacity of the general-purpose register group 3 is needed, the CBP 4 is updated by a load instruction so as to upgrade the content of the general-purpose register group 3. When another interrupt occurs, the content of the general-purpose register group 3 is saved to a bank specified by the CBP 4, and the PC 6 and PSW 8 are saved to a bank specified by both the BBP 12 and DSR 14.

Since, in the above fourth embodiment, a bank is specified based on a distance to a register, an operand length of the instruction and the interrupt mode word are shortened compared to the third embodiment. On the other hand, the number of register used is increased and extra time is consumed to combine the BBP 12 and DSR 14 whenever the PC 6 and PSW 8 are saved/restored.

FIGS. 12A–12C shows a fifth embodiment where there is further provided a distance-to-current-register (DCR) 16 for storing data indicating a distance from the BBP 12 to CBP 4. Thereby, a bit length of the register is further decreased. Compared to the above fourth embodiment, in the fifth embodiment the operand length as well as the number of registers are further decreased, so that a speed for save/restore is made further faster.

Accordingly, the third through fifth embodiments describe the possibility that the update of the general-purpose register or a register file is executed at a high speed. Moreover, since a bank to which the PC and PSW are saved can be specified for each different task, the bank can be shared between tasks and within a task or between single interrupts, etc., thus improving the efficiency of the bank memory.

Referring back again to FIG. 2A and FIG. 2B, the CPU 1 or CPU core is connected to the built-in RAM 2 via an exclusive-use data bus which is provided for exclusively transferring data therebetween. Conventionally, the data are transferred by way of the system bus as explained before. In contrast, by employing the present invention where the data are transferred not through the system bus but the exclusive-use data bus, the data can be transferred at high speed. Namely, since the contents of the general-purpose registers as well as the exclusive-use registers are saved/restored to and from the bank RAM 2 (built-in RAM) through the exclusive-use data bus, the data transfer can be sped up significantly.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A processor comprising:

a CPU including a plurality of exclusive-use registers, a plurality of general purpose registers, an arithmetic logic unit and a controller for controlling execution of instructions;

a system bus connected to said CPU;

a program memory connected to said system bus for storing a program and for supplying instructions to said CPU through said system bus;

a data memory connected to said system bus for storing data and for exchanging data with said CPU through said system bus during execution of said program;

an exclusive-use bus connected to said CPU and provided separate from said system bus; and a bank memory providing a plurality of register banks for temporarily saving and restoring the contents of said general purpose registers through said exclusive-use bus, wherein said exclusive-use registers include (a) a current bank pointer register for storing a pointer indicative of current banks of said plurality of register banks for saving the contents of said general purpose registers being used in a current task and (b) a previous bank pointer register for storing a pointer indicative of previous banks of said plurality of register banks for saving the contents of said general purpose registers used in a previous task.

2. The processor as claimed in claim 1, wherein the contents of said general purpose registers are directly transferred between said current bank pointer register and said previous bank pointer register when bank switching occurs.

3. The processor as claimed in claim 2, wherein said exclusive-use bus comprises an address bus for carrying an address indicative of a bank of said plurality of register banks and a data bus through which the contents of said general purpose registers are transferred, when bank switching occurs, in accordance with the address on said address bus.

4. The processor as claimed in claim 3, wherein the contents of said exclusive-use registers are saved in a bank of said plurality of register banks through said exclusive-use bus when bank switching occurs.

5. The processor as claimed in claims 4, wherein a bus width of said exclusive-use bus is wider than a width of said system bus.

* * * * *